United States Patent [19]

Lipski

[11] Patent Number: 4,534,072
[45] Date of Patent: Aug. 13, 1985

[54] W.C. SEAT FOR CHILDREN

[76] Inventor: Mordechai Lipski, New Industrial Area, Accadia Hwy., Herzliya, Israel

[21] Appl. No.: 616,688

[22] Filed: Jun. 4, 1984

[30] Foreign Application Priority Data

Jul. 8, 1983 [IL] Israel ............ 69189

[51] Int. Cl.³ ............................................. A47K 13/00
[52] U.S. Cl. ............................................. 4/237; 4/235; 4/254
[58] Field of Search .................. 4/237, 234, 235, 254

[56] References Cited

U.S. PATENT DOCUMENTS

| | | | |
|---|---|---|---|
| 1,297,177 | 3/1919 | Johnson | 4/254 UX |
| 2,607,926 | 8/1952 | DePuy | 4/254 |
| 2,649,139 | 8/1953 | Singleton | 4/254 X |
| 2,752,610 | 7/1956 | Mobrey | 4/254 X |
| 4,205,404 | 6/1980 | Levins | 4/254 |

Primary Examiner—Henry K. Artis
Attorney, Agent, or Firm—Maky, Renner, Otto & Boisselle

[57] ABSTRACT

A structure is provided to enable small children to sit safely on top of a water closet (W.C.) bowl, such structure comprising two legs between which—at a height slightly above the height of a standard W.C. bowl—there is provided a seat with an aperture small enough to prevent an infant to slip therethrough, the said seat extending horizontally away from the said legs, there being further provided, extending horizontally in opposite direction to that of the seat, and at a lower level relative to the seat, a step onto which an infant can step and from the upright position on the step can comfortably sit down on the seat.

4 Claims, 2 Drawing Figures

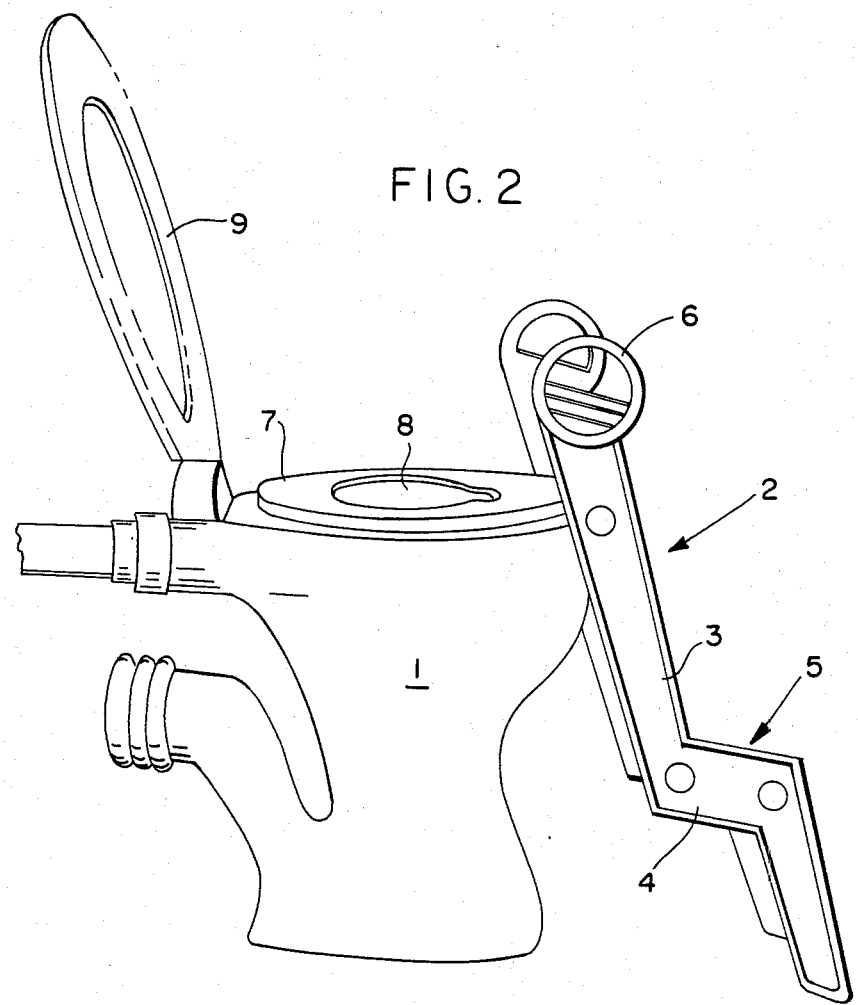

W.C. SEAT FOR CHILDREN

BACKGROUND AND FIELD OF INVENTION

Many educators recommend that infants be trained at early age to use the W.C. without help by a parent or other adult person. Obviously small children have difficulty or are even unable to mount the W.C. bowl and properly sit on the seat. But even a child who manages to sit on the W.C. seat is likely to slip and fall, possibly into the bowl. There have been suggested seat covers having a sufficiently small aperture, by which the danger of the infant falling is removed but still, these covers do not facilitate an infant's mounting the W.C. bowl.

OBJECT OF THE INVENTION

It is the object of the present invention to provide a means which prevents a small child from dropping into the bowl and which allows the child to comfortably assume a sitting position on top of the bowl.

SHORT SUMMARY OF DISCLOSURE

According to the invention there is provided a structure comprising two legs between which—at a height slightly above the height of a standard W.C. bowl—there is provided a seat with an aperture small enough to prevent an infant to slip therethrough, the said seat extending horizontally away from the said legs, there being further provided, extending horizontally in opposite direction to that of the seat, and at a lower level relative to the seat, a step onto which an infant can step and from the upright position on the step can comfortably sit down on the seat.

SHORT DESCRIPTION OF DRAWINGS

The invention will now be described with reference to the annexed drawings showing in FIG. 1 the new device in a perspective view, while FIG. 2 is an elevational side view, both figures showing the device in position on a conventional W.C. bowl.

DESCRIPTION OF PREFERRED EMBODIMENT

Figure 1:
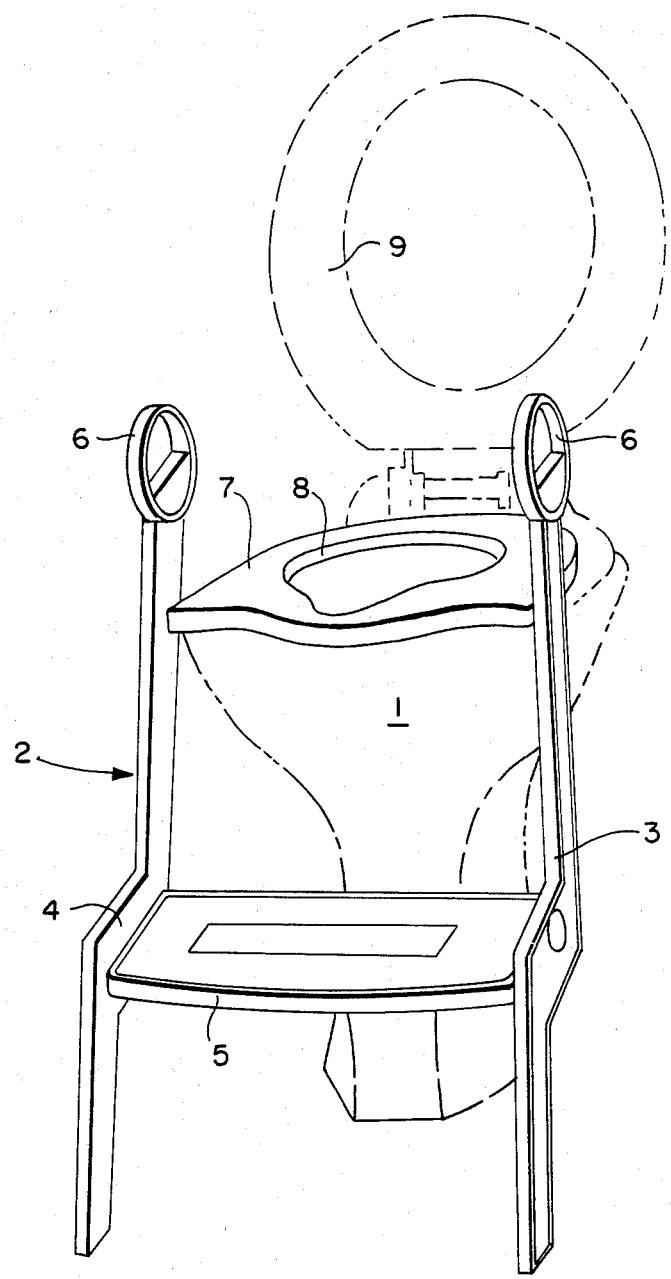

In the drawings the standard W.C. bowl is indicated by the FIG. 1 while the new device is indicated by numeral 2.

The device consists of two legs 3, the upper portion of which is rearwardly set off relative to the lower leg portions. Between the said upper and lower portions of legs 3 extend a substantially horizontal portion 4. Between the two portions 4 of opposite legs 3 extend—and fixed to portions 4—a step 5. At the upper, free ends of legs 3 are provided handles 6. Somewhat below the said upper ends, and at the approximate level of the seat of a standard W.C. is held between legs 3 a seat 7 which has a hole 8. The seat extends rearwardly, i.e. away from the legs 3 and in the direction opposite to that of step 5.

In use the normal seat 9 of the W.C.. is swung upwardly as shown in the drawings and the new device 2 is placed in front of bowl 1 with seat 7 extending above the bowl and being supported on it. A child standing on step 5 can turn round and sit down securely on the seat 7.

I claim:

1. A structure for use as a seat on W.C. bowls, comprising:
   . two legs having an upper portion, a lower portion and a substantially horizontal portion, said substantially horizontal portion located between said upper portion and said lower portion, a seat located between said legs at a height slightly above the height of a standard W.C bowl, said seat having an aperture small enough to prevent an infant from slipping therethrough while permitting body waste of the infant to pass therethrough while the infant is sitting thereon, said seat extending horizontally away from the said legs for positioning over a conventional W.C. bowl, a step extending horizontally in opposite direction to that of the seat at a lower level relative to the seat, said step located between said substantially horizontal portions of said legs and onto which an infant can step and from the upright position on the step can comfortably sit down on the seat.

2. The structure according to claim 1, wherein said legs have handle grips at their upper, free ends.

3. The structure according to claim 2, wherein said handle grips have a gripping surface which is always tangential to the user's hands regardless of the angle which the user's forearms make with said legs.

4. A structure for use as a seat on W.C. bowls, comprising:
   two legs, a seat located between said legs at a height slightly above the height of a standard W.C. bowl, said seat having an aperture small enough to prevent an infant from slipping therethrough, while permitting body waste of the infant to pass therethrough while the infant is sitting thereon, said seat extending horizontally away from the said legs for positioning over a conventional W.C. bowl, a step extending horizontally in opposite direction to that of the seat at a lower level relative to the seat, said step located between said legs and onto which an infant can step and from the upright position on the step can comfortably sit down on the seat, and wherein said legs have handle grips at their upper, free ends, and said handle grips have a gripping surface which is always tangential to the user's hands regardless of the angle which the user's forearms make with said legs.

* * * * *